United States Patent [19]
Hohenberg

[11] 3,754,471
[45] Aug. 28, 1973

[54] PNEUMATIC SHAFT SPEED SENSOR
[75] Inventor: Rudolph Hohenberg, Trumbull, Conn.
[73] Assignee: Avco Corporation, Stratford, Conn.
[22] Filed: Feb. 23, 1972
[21] Appl. No.: 228,660

[52] U.S. Cl. .................... 73/506, 73/521, 137/830
[51] Int. Cl. ............................................. G01p 3/26
[58] Field of Search .................. 137/81.5, 805, 826, 137/830; 73/506, 521

[56] References Cited
UNITED STATES PATENTS
3,392,739  7/1968  Taplin et al. .................. 73/521 UX
3,680,595  8/1972  Boulton ........................ 137/81.5 X
3,601,138  8/1971  Glattli et al. ................... 137/81.5
3,503,479  3/1970  Canova ........................ 73/506 UX Primary Examiner—James J. Gill
Attorney—Charles M. Hogan and Irwin P. Garfinkle et al.

[57] ABSTRACT

A cylindrical disk having a plurality of evenly spaced peripheral notches is mounted on a rotating shaft. The speed of the shaft is measured by radially directing air under pressure to the peripheral surface of the disk and by sensing the pressure changes each time the supply of air impinges on a notched portion. In a second embodiment air is axially directed onto the planar surface of a rotating disk provided with apertures or indentations. In a third embodiment air is directed onto a planar surface which is moving linearly.

6 Claims, 4 Drawing Figures

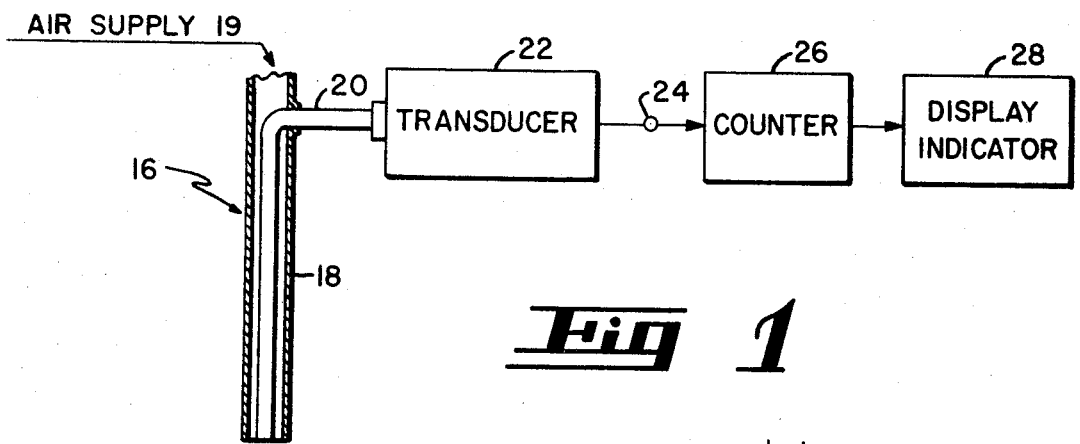
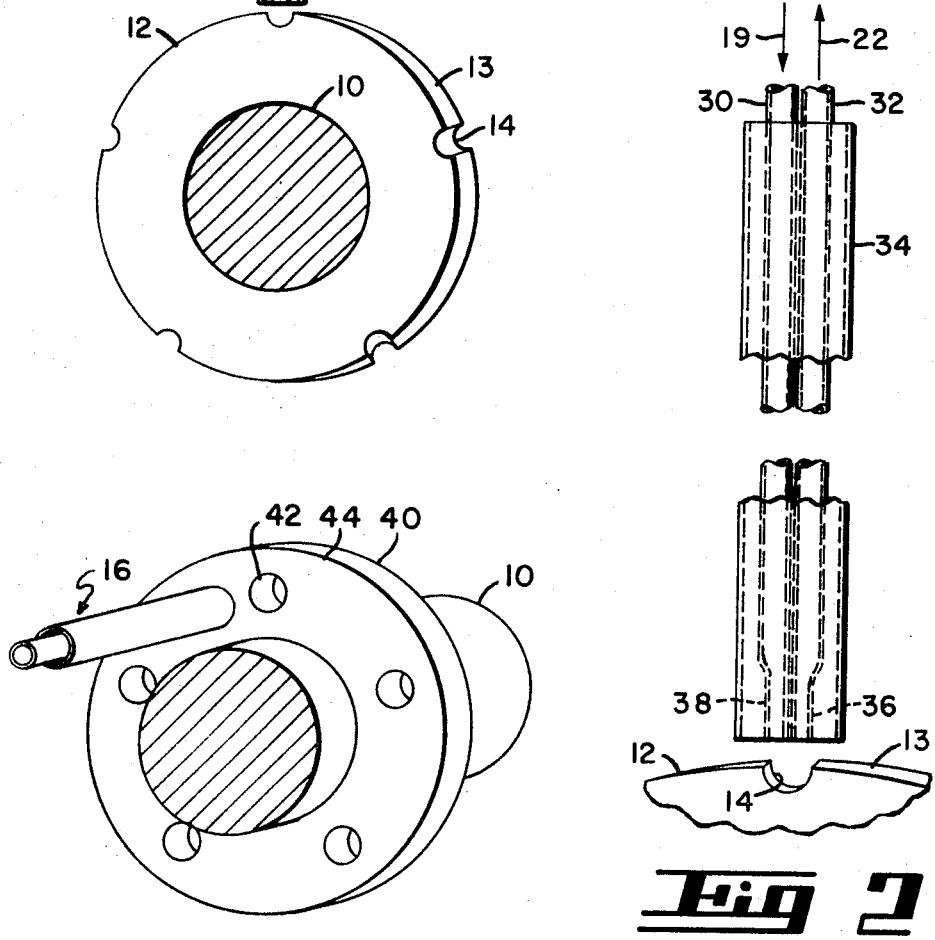
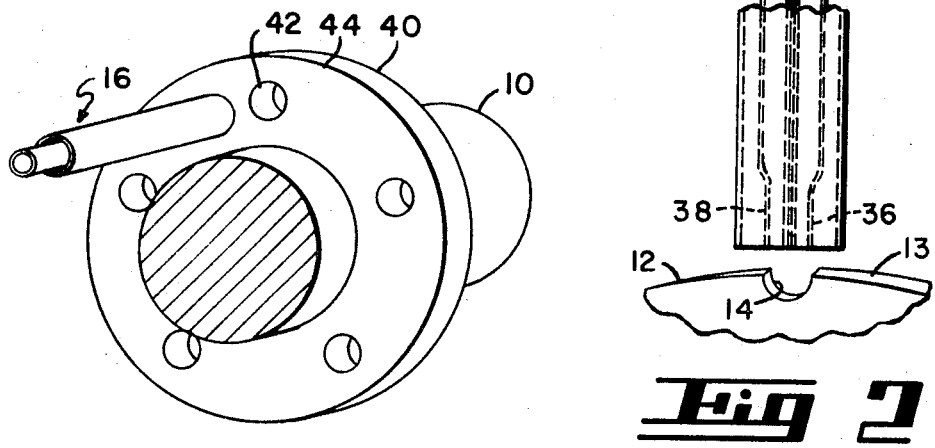
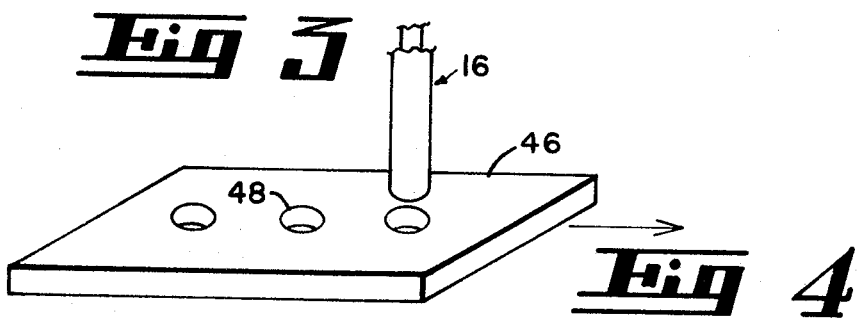

PNEUMATIC SHAFT SPEED SENSOR

BACKGROUND OF THE INVENTION

In the operation of a gas turbine engine it is necessary to provide indications of the power turbine shaft speed. Conventionally this is accomplished by a magnetic pickup which senses each time it is passed by a magnet or magnetic material causing a discontinuity of the pickup's magnetic field. However, in the vicinity of the power turbine there is a very high temperature environment in which conventional electrical and magnetic detectors cannot reliably survive. This invention utilizes a pneumatic sensor and transduces variations in pressure to an electrical signal for the purpose of sensing speed. It has been found that such sensors are not sensitive to high temperatures and that reliable speed indications can be made.

THE DRAWING

FIG. 1 describes a typical embodiment of this invention;

FIG. 2 shows a modified probe which may be used in accordance with this invention;

FIG. 3 is a modification which apertures are provided through the planar face surface of a rotating disk; and FIG. 4 is a modification useful in measuring linear motion.

DESCRIPTION OF THE INVENTION

Referring to FIG. 1, the object of the invention is to measure the speed of a shaft 10 which typically may be the power shaft of a gas turbine engine (not shown). Under normal operating conditions the power shaft rotates at relatively high speeds and, in modern gas turbines, operates in very high temperature environments.

The speed sensor is made up of two parts. One is a disk or cylinder 12 fixedly attached to the shaft 10. The surface of the cylinder 12 is generally smooth, but is provided with a plurality of circumferentially disposed equidistantly spaced discontinuities, such as notches or detents 14.

The second element of the speed sensor is a probe 16 containing two pressure transfer lines or tubes 18 and 20. In the embodiment of FIG. 1 the tubes 18 and 20 are coaxial, one positioned inside the other but spaced therefrom. The outer tube 18 is connected to a supply of air 19, for example, the discharge from the compressor (not shown) of the gas turbine. The inner tube 20 is pneumatically connected to a pneumatic pressure sensitive transducer 22 which serves to convert changes of gas pressure to voltage pulses. The voltage pulse output from the transducer 22 is applied via terminal 24 to a frequency counter 26 which serves to count the number of voltage pulses generated in a given period of time. The output from the counter 26 is displayed on an indicator 28.

As the disk or cylinder 12 rotates, air is directed under pressure to its peripheral surface 13 from the air supply 19 through the tube 18. The air pressure generated on the peripheral surface remains constant until one of the notches 14 is passed. The pressure generated at peripheral surface of the disk 12 is transferred to the transducer 22 through the tube 20. When a dentent or notch 14 is passed, there is a sudden decrease in pressure, and this decrease in pressure is sensed by the transducer 22 which delivers a voltage pulse in response to the abrupt change in pressure. The voltage pulse output is applied via terminal 24 to a counter 26 which counts the number of changes in pressure over a given period of time, for example, one second, and supplies such count to a display device 28.

In the illustrated embodiment, the disk is provided with five notches and therefor five voltage pulses are generated per revolution of the shaft 10. It is to be understood that the number of such notches is a matter of design and may vary for the particular application. In the test of apparatus reduced to practice, it was found that a variation in the pressure supply does not affect wave shape of the generated voltage pulses, but merely changes the amplitude. This means that variations in air pressure supply will not change the number of pulses that are generated. It was found, however, that the spacing between the end of the probe and the circumference of the disk may be a critical factor. It was found that at some gap spacings and speeds a double-humped waveform was produced, thereby causing an erroneous reading. In the particular environment in which the invention was reduced to practice it was found that a spacing of approximately 0.010 inches to 0.050 inches with input air pressures of from 15 to 50 p.s.i. a single pulse was developed each time the probe passes a notched position, and a highly accurate speed reading was achieved.

In the embodiment of FIG. 2 a modified probe is shown as containing two parallel tubes 30, 32 within a common tube 34. The tube 30 supplies air under pressure to the disk 12 while the tube 32 transfers the pressure changes to the transducer 22. Both tubes are pinched at their pressure-responsive ends 36 and 38, respectively, so that an oval cross-section is presented to the disk periphery.

Obviously, there are many arrangements that may be used for supplying gas pressure to the disk 12 and for transferring variations to the transducer. FIGS. 1 and 2 are illustrative of arrangement in which the supply and transfer tubes are, respectively, concentric and parallel. The tubes may also have varied shapes and need only be arranged so that the transfer tubes are in a locale sensitive to the gas pressures on the rotating disk.

The embodiment of FIG. 3 shows a disk 40 mounted on the rotating shaft 10. Unlike the disk 12 which is provided with notches 14 on its periphery, the disk 40 is provided with circumferentially spaced apertures 42 in its planar face surface 44. The probe 16 may take the same form as that shown in FIG. 1 or FIG. 2 or any other configuration permitting the air to be directed onto the rotating surface 44.

While the surface 44 is shown as flat, it may take many other shapes such as toroidal so long as the path traversed by the axially directed gases is uniform except for the discontinuities provied by the apertures or notches 42.

In the embodiment of FIG. 4 the probe 16 is directed at right angles to a moving linear surface 46 on which a plurality of linearly aligned apertures 48 are positioned.

SUMMARY OF THE INVENTION

In each of the illustrated emboidments a supply of gas is directed onto a moving surface provided with discrete discontinuities. In each case the speed of motion of the surface is determined by detecting the number of changes in pressure resulting from the passage of the gases over the areas of discontinuity.

I claim:

1. A speed sensor for measuring the speed of movement of a body having a uniform surface, said body moving in an environment, the combination comprising:

a plruality of spaced discontinuities in said surface, sand spaced discontinuities being aligned with the path of movement of said surface;

a source of gas pressure;

a pressure transducer for sensing changes in gas pressure; and stationary transfer means comprising first and second cylindrical tubes, each having an end perpendicularly directed toward said surface and slightly spaced therefrom, the other end of said tubes being connected to said source and said transducer, respectively, said first tube directing gas from said source onto said moving surface for establishing an area of gas pressure through which said surface moves, said gas discharging generally into said environment, a relatively constant gas pressure being established on said surface when said area is between said discontinuities, said gas pressure abruptly changing when said discontinuity passes through said area, said second tube transferring said change in pressure to said transducer.

2. The invention as defined in claim 1 wherein said surface is planar and rotates on an axis perpendicular thereto, said discontinuities being angularly spaced in a circumferential path.

3. The invention as defined in claim 1 wherein said surface is a planar surface moving in a linear path.

4. The invention as defined in claim 1 wherein said surface is cylindrical and rotates on the axis of said cylinder.

5. The invention as defined in claim 1 wherein said second tube is positioned coaxially within said first tube but spaced therefrom, said other ends of said first and second tubes being coplanar.

6. The invention as defined in claim 1, wherein said first and second tubes are abutting and parallel, and a third tube, said first and second tubes being positioned within but spaced from said third tube, said other ends of said first and second tubes being coplanar with an end of said third tube.

* * * * *